(12) United States Patent
Lee et al.

(10) Patent No.: US 10,661,717 B2
(45) Date of Patent: May 26, 2020

(54) CONSOLE DEVICE FOR VEHICLE

(71) Applicants: Hyundai Motor Company, Seoul (KR); Kia Motors Corporation, Seoul (KR); Ecoplastic Corporation, Gyeongju, Gyeongsangbuk-do (KR)

(72) Inventors: Young Ju Lee, Gyeonggi-do (KR); Eun Sue Kim, Gyeonggi-Do (KR); Dong Jin Park, Daegu (KR)

(73) Assignees: Hyundai Motor Company, Seoul (KR); Kia Motors Corporation, Seoul (KR); Ecoplastic Corporation, Gyeongju, Gyeongsangbuk-do (KR)

(*) Notice: Subject to any disclaimer, the term of this patent is extended or adjusted under 35 U.S.C. 154(b) by 86 days.

(21) Appl. No.: 16/037,219

(22) Filed: Jul. 17, 2018

(65) Prior Publication Data

US 2019/0315281 A1 Oct. 17, 2019

(30) Foreign Application Priority Data

Apr. 12, 2018 (KR) .......................... 10-2018-0042977

(51) Int. Cl.
*B60R 7/04* (2006.01)
*B60R 21/045* (2006.01)

(52) U.S. Cl.
CPC .............. *B60R 7/04* (2013.01); *B60R 21/045* (2013.01)

(58) Field of Classification Search
CPC .................................. B60R 21/045; B60R 7/04
USPC .............................................. 296/24.34, 37.8
See application file for complete search history.

(56) References Cited

U.S. PATENT DOCUMENTS

| | | | | |
|---|---|---|---|---|
| 6,921,118 B2 * | 7/2005 | Clark | ..................... | B60N 3/102 |
| | | | | 296/24.34 |
| 8,894,120 B2 * | 11/2014 | Lechkun | ................... | B60N 3/00 |
| | | | | 296/24.34 |
| 9,694,659 B2 * | 7/2017 | Timmermann | .......... | B60J 10/30 |
| 9,956,894 B2 * | 5/2018 | Jang | ......................... | B60N 2/78 |
| 2008/0303302 A1 * | 12/2008 | Sturt | ......................... | B60R 7/04 |
| | | | | 296/24.34 |

FOREIGN PATENT DOCUMENTS

CN 103568976 A * 2/2014
KR 20-2015-0000963 3/2015

* cited by examiner

*Primary Examiner* — Pinel E Romain
(74) *Attorney, Agent, or Firm* — Mintz Levin Cohn Ferris Glovsky and Popeo, P.C.; Peter F. Corless

(57) ABSTRACT

A console device for a vehicle is provided. A console box is provided to be movable to a desired position in the forward-and-backward direction of the vehicle. The console box is inserted into the space under a crash pad when the console box moves in the forward direction of the vehicle. Therefore, utilization of the interior space of the vehicle is maximized, and the console device is therefore suitable for installation in an autonomous vehicle.

13 Claims, 15 Drawing Sheets

CONSOLE DEVICE FOR VEHICLE

CROSS-REFERENCE TO RELATED APPLICATION

This application claims the priority benefit of Korean Patent Application No. 10-2018-0042977, filed on Apr. 12, 2018 in the Korean Intellectual Property Office, the disclosure of which is incorporated herein by reference.

BACKGROUND

1. Field of the Disclosure

The present disclosure relates to a console device for a vehicle, and more particularly to a console device for a vehicle that is slidable in the forward-and-backward direction.

2. Description of the Related Art

An autonomous vehicle is a type of smart vehicle, which travels autonomously, specifically, which is capable of travelling autonomously to a set destination without a manual manipulation of the steering wheel, the accelerator, the brake, or the like by a driver. The development of such autonomous vehicles is accelerating.

When autonomous traveling technology is commercialized, the vehicle may be designed, for example, with front seats capable of being moved to desired positions or rotated to be oriented to face backwards. In other words, the interior configuration of the vehicle may change as the driver is not required to manually manipulate vehicle functions for the vehicle to be driven. A general console box for a vehicle is fixed to a predetermined position between the driver's seat and the front passenger seat. However, a console box having a stationary structure is not suitable for an autonomous vehicle, in which optimal utilization of interior space is important.

The information disclosed in this section is merely for enhancement of understanding of the general background of the disclosure and should not be taken as an acknowledgement or any form of suggestion that this information forms the related art already known to a person skilled in the art.

SUMMARY

Therefore, the present disclosure provides a console device for a vehicle that is located between the driver's seat and the front passenger seat and is configured to be movable in the forward-and-backward direction to be suitable for an autonomous vehicle, in which optimal utilization of interior space is important.

In accordance with an aspect of the present disclosure, a console device for a vehicle may include a console box movably mounted in an interior space of a vehicle to be inserted into a space under a crash pad.

In accordance with another aspect of the present disclosure, a console device for a vehicle may include a console box coupled to a rail unit mounted in an interior space of a vehicle to be movable along the rail unit; a locking unit mounted to be connected with the rail unit and the console box to restrict or allow movement of the console box; and a locking operation unit that enables the locking unit to be operated manually or automatically, the locking operation unit allowing the console box to move along the rail unit upon automatic operation of the locking unit.

The rail unit may include a fixed rail fixed to a floor panel, and a moving rail connected to the console box, the moving rail being coupled to the fixed rail to be movable along the fixed rail. The locking unit may include a locking rail fixed to a floor panel to be arranged parallel to the rail unit, the locking rail having locking recesses formed continuously in a longitudinal direction thereof, and a locking lever mounted to a console bracket coupled to the console box to be rotatable. The locking lever may have a locking protrusion that protrudes from one end thereof. When the locking protrusion is inserted into one of the locking recesses, the locking lever may restrict movement of the console box. When the locking protrusion is withdrawn from the locking recesses, the locking lever may release restriction of movement of the console box.

The locking operation unit may include a hinge lever rotatably coupled to the console bracket, the hinge lever being maintained in contact with the locking lever, and a manual operation unit for allowing the hinge lever to be operated manually. The manual operation unit may include a front handle and a rear handle respectively coupled to a front surface and a rear surface of the console box to be rotatable, and an operation cable that interconnects the front handle and the hinge lever and that interconnects the rear handle and the hinge lever.

The locking operation unit may include a hinge lever rotatably coupled to the console bracket, the hinge lever being maintained in contact with the locking lever; an automatic operation unit configured to automatically operate the hinge lever; and a controller configured to operate the automatic operation unit by receiving signals from a manipulation unit based on a manipulation by a user. The automatic operation unit may include a first solenoid fixed to the console bracket to be disposed adjacent the hinge lever, configured to supply of electrical power to the first solenoid being operated by the controller, and a plunger disposed at the first solenoid to move forwards or backwards while contacting the hinge lever.

The locking operation unit may further include a motor configured to be operated by the controller; a motor shaft directly connected to the motor to be rotated therewith; a driving pulley coupled to an outer circumferential surface of the motor shaft to rotate relative thereto via a bearing; a clutch unit coupled to the motor shaft to interconnect or disconnect the motor shaft and the driving pulley in response to supply or interruption of electrical power; and a power transmission belt coupled to the console bracket while interconnecting the driving pulley and a driven pulley. The driving pulley and the driven pulley may be disposed near a first end and a second end (e.g., an opposite end) of the rail unit, idle rollers may be rotatably mounted adjacent to the driving pulley and the driven pulley to maintain constant tension of the power transmission belt, and the power transmission belt may be disposed over the driving pulley and the driven pulley via the idle rollers.

The clutch unit may include a locking pin housing and a locking pin cover coupled to the motor shaft; a second solenoid coupled to the locking pin cover to allow the locking pin cover to be rotated with the motor shaft, supply of electrical power to the second solenoid being operated by the controller; and a plurality of locking pins, each having a first end that is mounted in the locking pin cover to be elastically supported by a corresponding one of springs and a second end that penetrates the locking pin housing and protrudes toward the driving pulley.

When electrical power is supplied to the second solenoid, the locking pins may be moved backwards while compressing the springs, and may be disconnected from the driving pulley. When supply of electrical power to the second solenoid is interrupted, the locking pins may be moved forward by elastic force of the springs, may be inserted into pulley apertures formed in the driving pulley, and may be connected to the driving pulley. The pulley apertures and the end portions of the locking pins that are inserted into the pulley apertures may be formed to have a round shape to allow the locking pins to be withdrawn from the pulley apertures when the motor is overloaded.

The console device may further include a first flange disposed at the driving pulley, the first flange being formed in a shape of a circular plate having therein a first sensing aperture; a second flange disposed at the motor shaft, the second flange being formed in a shape of a circular plate having therein a second sensing aperture; a first hall sensor configured to sense the first sensing aperture; and a second hall sensor configured to sense the second sensing aperture. When electrical power is applied to the motor, the controller may be configured to determine whether the motor is overloaded based on whether operation signals are transmitted thereto from the first hall sensor and the second hall sensor.

When electrical power is applied to the motor and when an operation signal from the first hall sensor and an operation signal from the second hall sensor are simultaneously transmitted to the controller, the controller may be configured to determine that the state of the motor is a normal state, in which the motor is not overloaded. When electrical power is applied to the motor and when an operation signal from the first hall sensor is not transmitted to the controller but an operation signal from the second hall sensor is transmitted to the controller, the controller may be configured to determine that the motor is overloaded. In response to determining that the motor is overloaded, the controller may be configured to cut off supply of electrical power to the motor to terminate operation of the motor by force.

BRIEF DESCRIPTION OF THE DRAWINGS

The above and other objects, features and other advantages of the present disclosure will be more clearly understood from the following detailed description taken in conjunction with the accompanying drawings, in which:

FIGS. 11 and 12 are cross-sectional views showing the coupled configuration of FIG. 10, wherein FIG. 11 is a view showing the state in which locking pins have been displaced from pulley apertures for manual movement of the console box and FIG. 12 is a view showing the state in which the locking pins are inserted into the pulley holes for automatic movement of the console box according to an exemplary embodiment of the present disclosure;

DETAILED DESCRIPTION

Figure 1A:
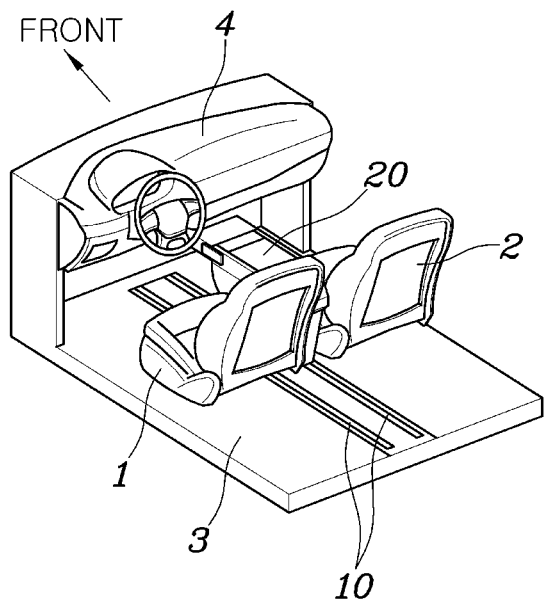
FIGS. 1A-1C are views illustrating the state in which a console box according to an exemplary embodiment of the present disclosure is moved in the forward-and-backward direction of the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. Wherever possible, the same reference numbers will be used throughout the drawings to refer to the same or like parts.

Figure 1B:
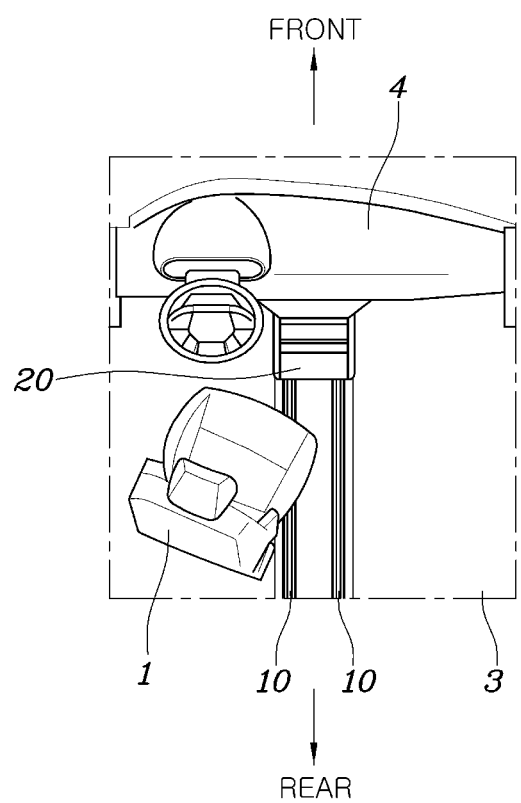
Figure 1C:
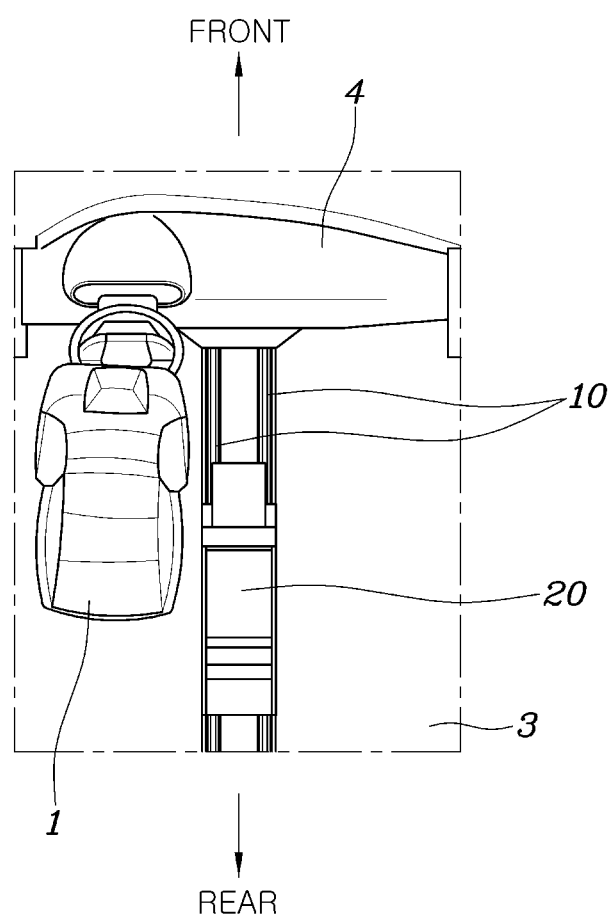
Figure 2:
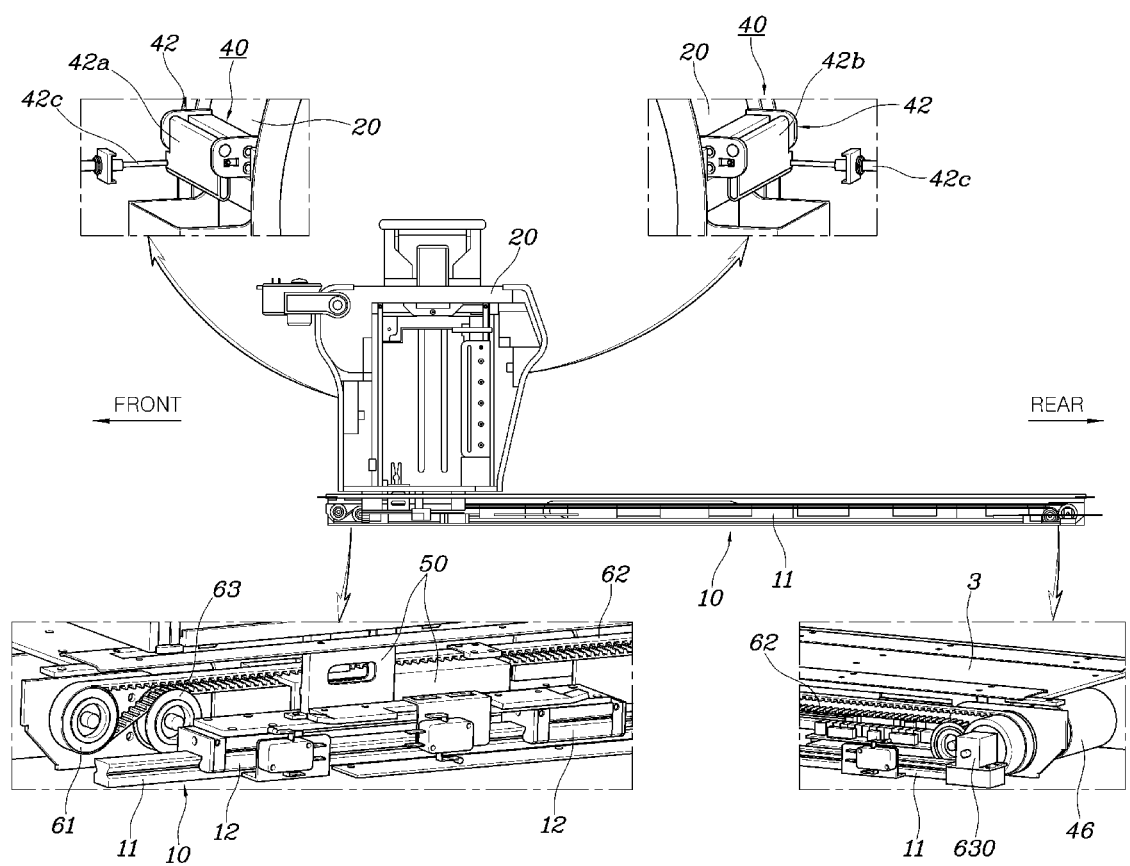
FIG. 2 is a side view illustrating a console device for a vehicle according to an exemplary embodiment of the present disclosure.
Figure 3:
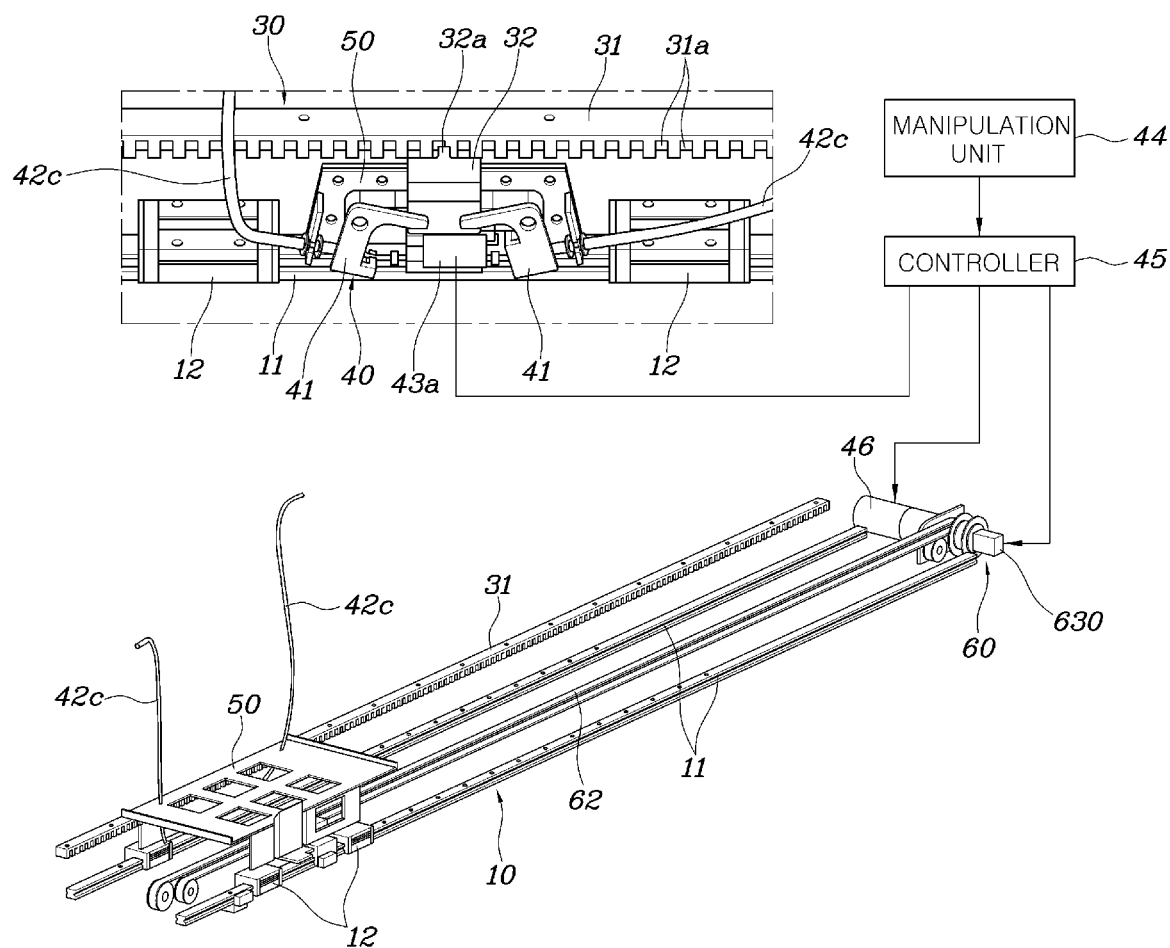
FIG. 3 is a view illustrating a rail unit, a locking unit and a locking operation unit according to an exemplary embodiment of the present disclosure.
Figure 4:
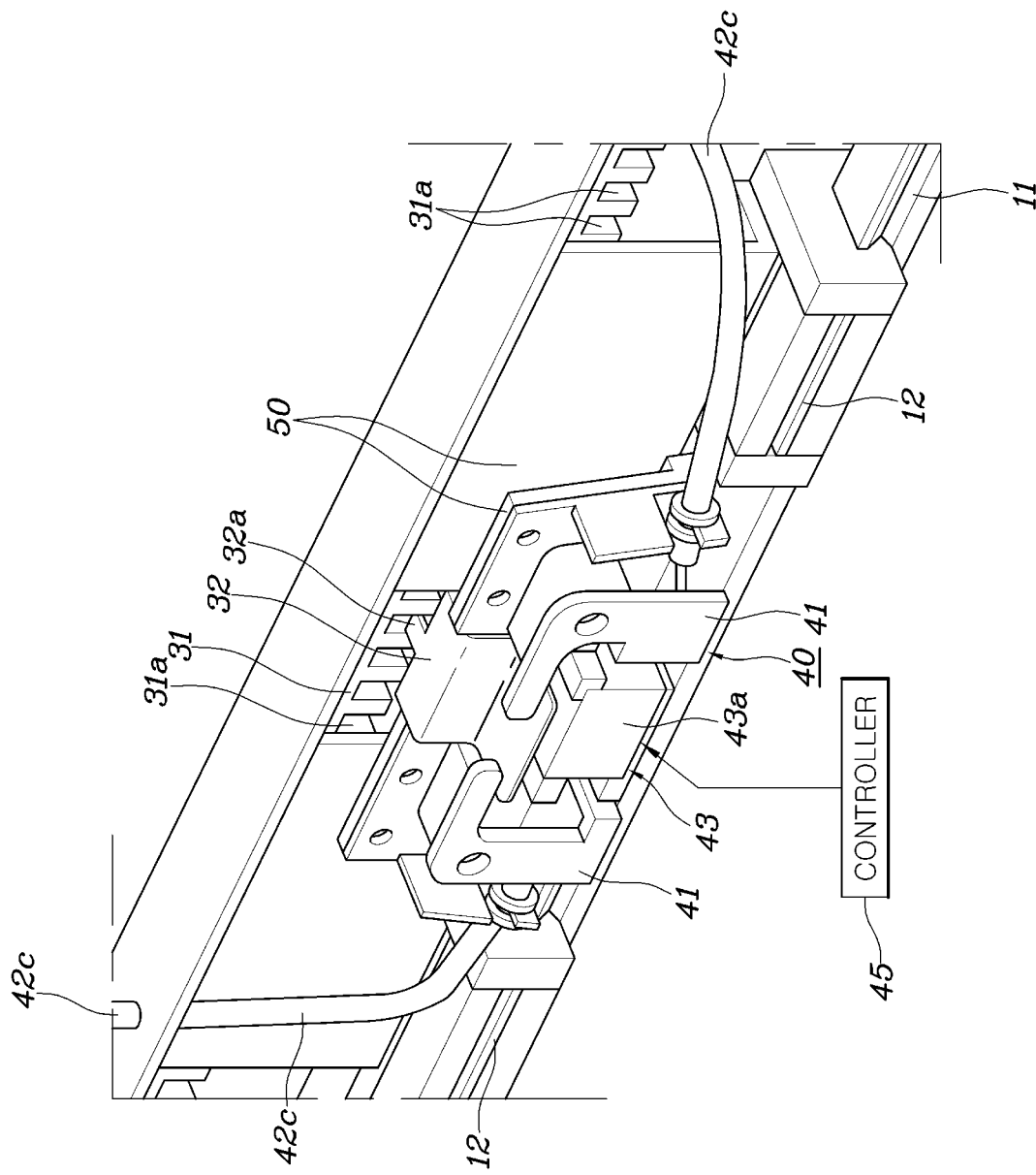
FIG. 4 is a view illustrating the locking unit and the locking operation unit according to an exemplary embodiment of the present disclosure.

As shown in FIGS. 1A-1C, in the exemplary embodiment according to the present disclosure, a console box 20 is disposed beside a driver's seat 1, and is mounted to be movable in the forward-and-backward direction of the vehicle. When the console box 20 moves in the forward direction of the vehicle and reaches the foremost position, the console box 20 may be inserted into the space under a crash pad 4 and prevented from being exposed to the interior space of the vehicle. Accordingly, utilization of the interior space of the vehicle is maximized, and the console device is therefore suitable for installation in an autonomous vehicle.

FIG. 1A illustrates a manual driving mode in which the driver manually drives the vehicle. In this state, the console box 20 may be located between the driver's seat 1 and a front passenger seat 2. FIG. 1B illustrates an autonomous traveling mode, in which the driver's seat 1 may be rotated backwards and the console box 20 may be moved forwards and enter the space under the crash pad 4 to avoid interference with the rotation of the driver's seat 1. FIG. 1C illustrates an autonomous traveling mode, in which the driver's seat 1 has been completely rotated backwards and the console box 20 may be moved backwards to allow the user to use the space comfortably and conveniently.

A detailed description of the console device for a vehicle according to an exemplary embodiment of the present disclosure will now be made with reference to FIGS. 1A to 13. As illustrated in the drawings, the console device may include the console box 20, coupled to a rail unit 10 to be movable along the rail unit 10, which extends in the forward-and-backward direction of the vehicle; a locking unit 30, mounted to be connected with the rail unit 10 and the console box 20 to restrict or allow movement of the console box 20; and a locking operation unit 40, which enables the locking unit 30 to be operated manually or automatically and which allows the console box 20 to move along the rail unit 10 upon automatic operation of the locking unit 30.

The rail unit 10 may include a fixed rail 11, which extends in the forward-and-backward direction and may be fixed to a floor panel 3, and a plurality of moving rails 12, which are connected to the console box and coupled to the fixed rail 11 to be movable along the fixed rail. The number of fixed rails 11 may be two (but the present disclosure is not limited thereto). The two fixed rails 11 may be spaced apart from each other in the lateral direction of the vehicle and arranged parallel to each other. Two moving rails 12 may be coupled to a respective one of the two fixed rails 11.

The locking unit 30 may include a locking rail 31, which is fixed to the floor panel 3 to be arranged parallel to the rail unit 10 and may include locking recesses 31a formed continuously in the longitudinal direction thereof, and a locking lever 32, mounted to a console bracket 50 and coupled to the console box 20, to be rotatable and which includes a locking protrusion 32a that protrude from one end thereof.

When the locking lever 32 rotates and the locking protrusion 32a is inserted into one of the locking recesses 31a, the movement of the console box 20 in the forward-and-backward direction may be restricted. When the locking protrusion 32a is displaced or withdrawn from the locking recesses 31a, movement of the console box 20 in the forward-and-backward direction may be permitted (e.g., not blocked). The console box 20 may be coupled at the bottom surface thereof to the console bracket 50, and the console bracket 50 may be coupled to the moving rails 12. Therefore, when the moving rails 12 move along the fixed rails 11, the console bracket 50 and the console box 20 may also move together with the moving rails 12.

The locking rail 31 may be disposed at a position spaced apart from the fixed rails 11 by a predetermined distance in the upward direction, and may be fixed to the floor panel 3 to be parallel to the fixed rails 11. The locking lever 32 may include the locking protrusion 32a, which protrudes from a first end of the locking lever 32 to be inserted into one of the locking recesses 31a. A second end (e.g., an opposite end) of the locking lever 32 may abut a hinge lever, which will be described later. The intermediate portion between the first end and the second end of the locking lever 32 may be coupled to the console bracket 50 via a hinge shaft and a spring to be rotatable.

The locking operation unit 40 may include a hinge lever 41, which is rotatably coupled to the console bracket 50 and in contact with the locking lever 32, and a manual operation unit 42, which allows the hinge lever 41 to be operated manually. The number of hinge levers 41 may be two, and the two hinge levers 41 may be disposed proximate to the left and right sides of the locking lever 32, with the locking lever 32 interposed therebetween. A first end of each of the hinge levers 41 is in contact with the opposite or second end of the locking lever 32, and a second end (e.g., an opposite end) of each of the hinge levers 41 may be coupled with an operation cable, which will be described later. The intermediate portion between the first end and the second end of each of the hinge levers 41 may be rotatably coupled to the console bracket 50 via a hinge shaft 41a.

The manual operation unit 42 may include a front handle 42a and a rear handle 42b, which are respectively coupled to the front and rear surfaces of the console box 20 to be rotatable, and an operation cable 42c, which interconnects the front handle 42a and one of the hinge levers 41 (e.g., a first hinge lever) and interconnects the rear handle 42b and the remaining one of the hinge levers 41 (e.g., a second hinge lever). The front handle 42a and the rear handle 42b may be respectively coupled to the front and rear surfaces of the console box 20 to be rotatable using hinge shafts and springs.

Figure 5:
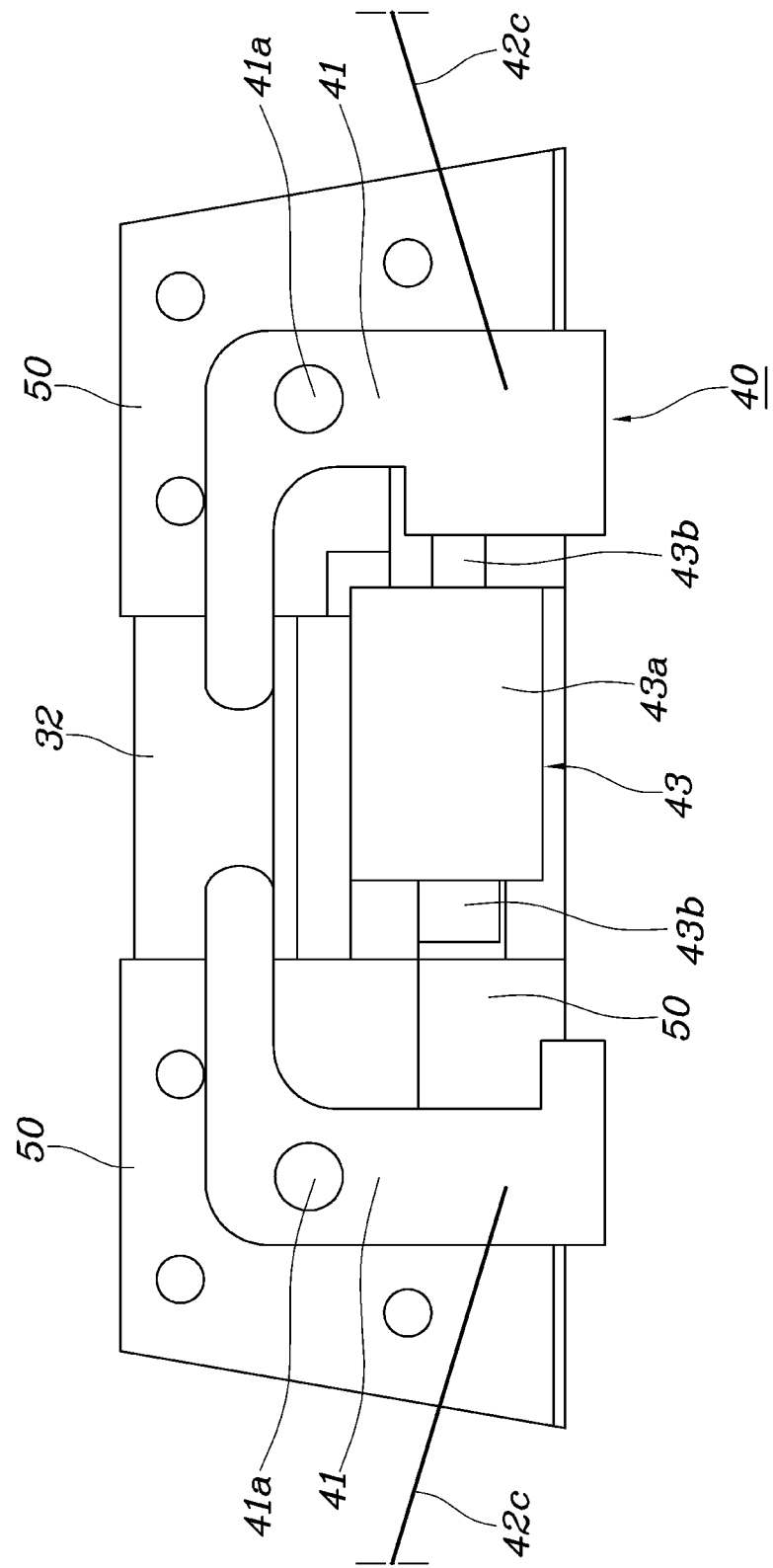
FIGS. 5 and 6 are views illustrating a locked state in which a locking protrusion of a locking lever is inserted into one of locking recesses formed in a locking rail according to an exemplary embodiment of the present disclosure.
Figure 6:
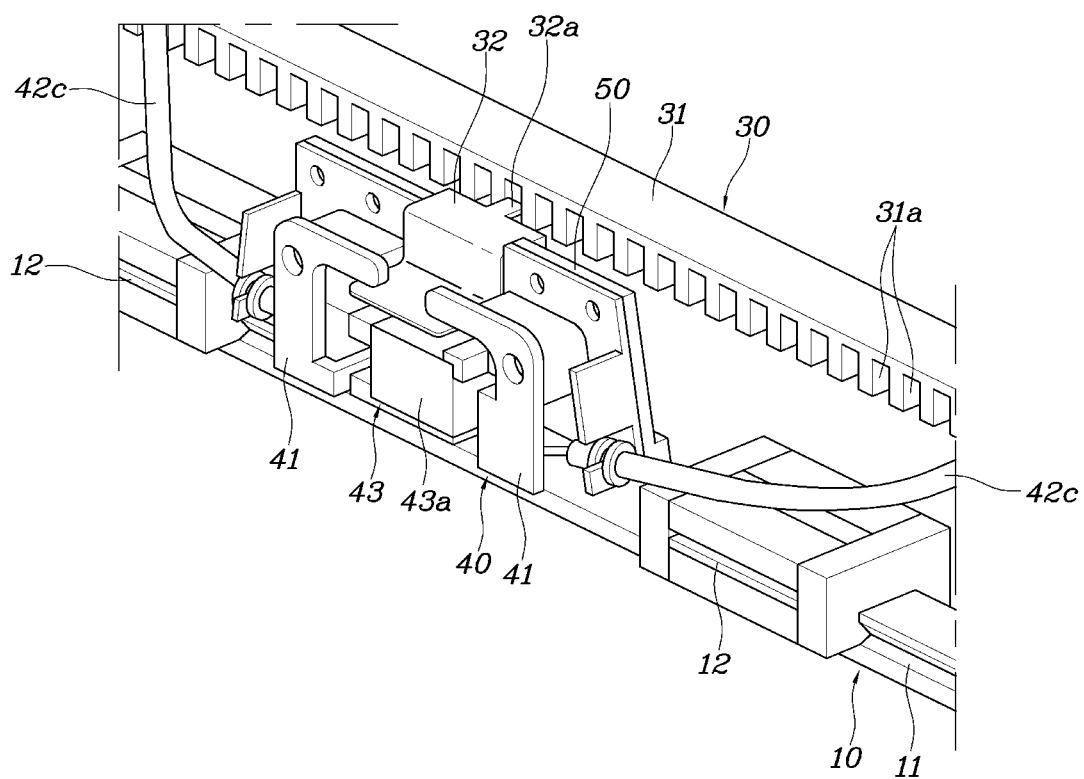
Figure 7:
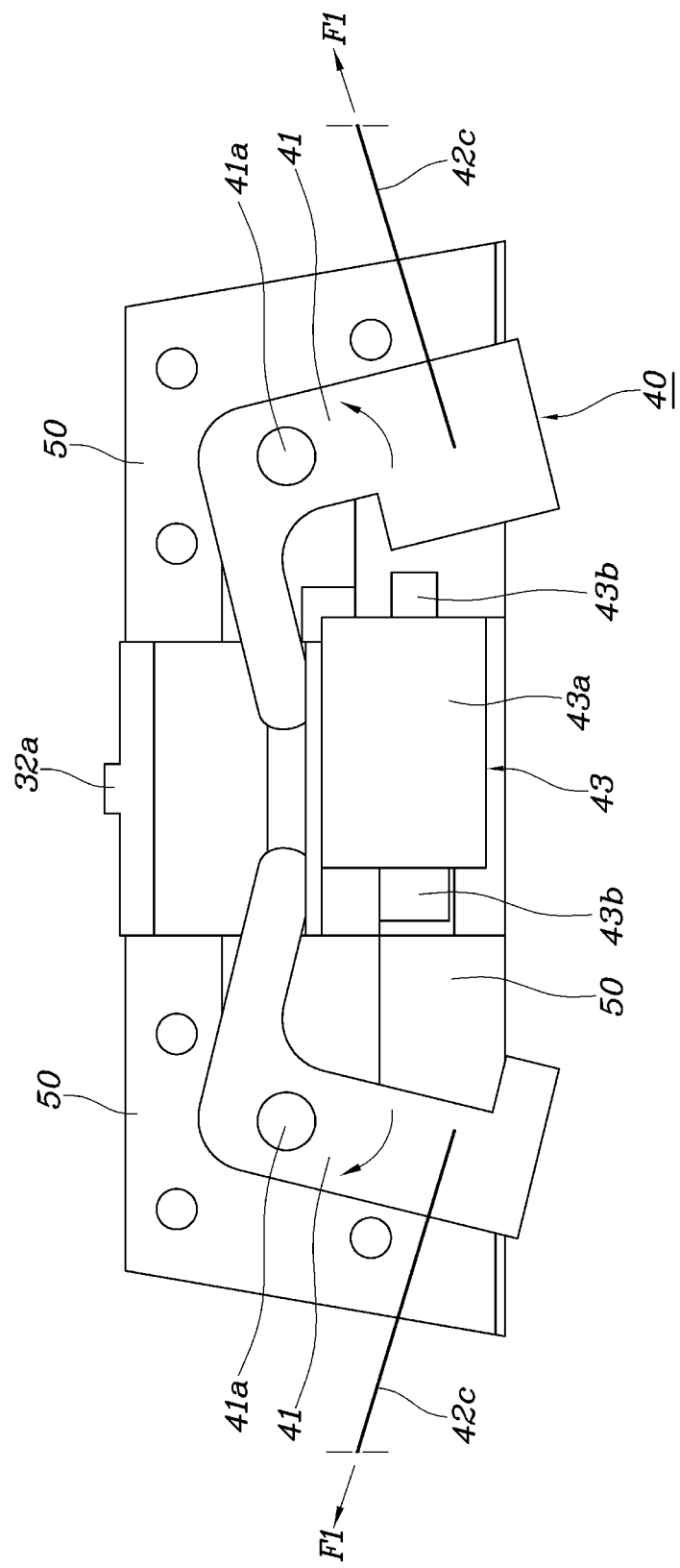
FIGS. 7 and 8 are views illustrating an unlocked state in which the locking protrusion of the locking lever has been displaced from the locking recesses formed in the locking rail when a front handle and a rear handle are operated to move the console box manually according to an exemplary embodiment of the present disclosure.
Figure 8:
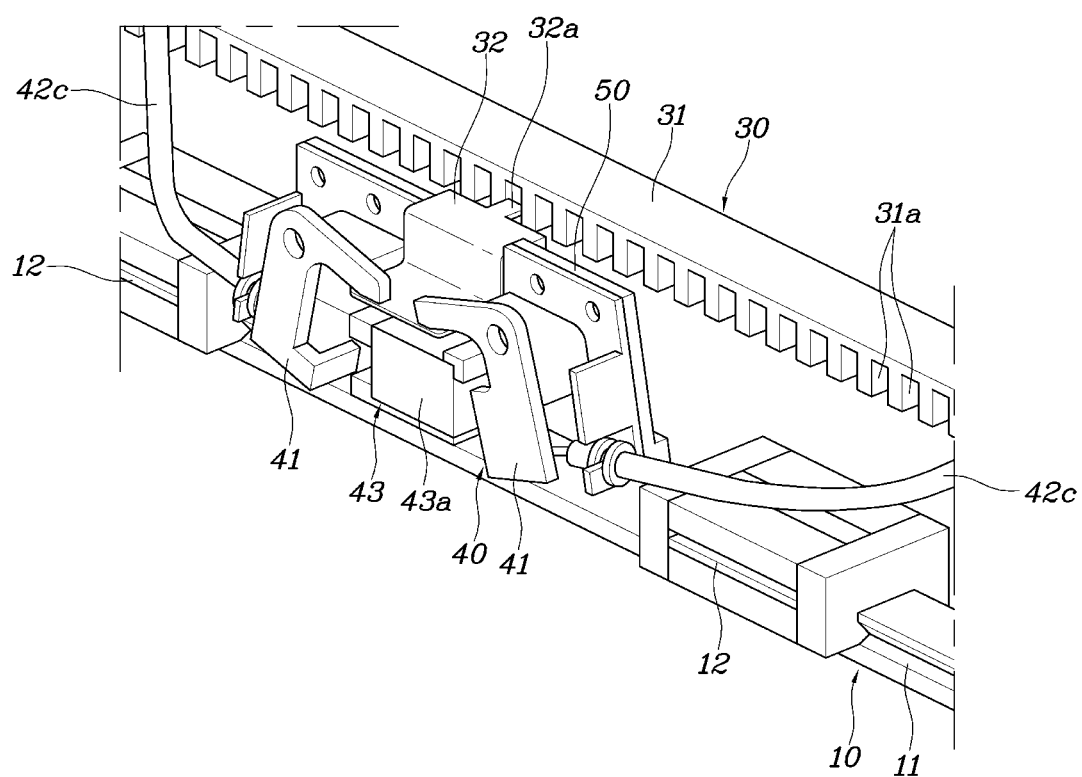

When no external force is applied to the locking lever 32, as shown in FIGS. 5 and 6, the locking protrusion 32a of the locking lever 32 is in the state of being inserted into one of the locking recesses 31a formed in the locking rail 31 due to the elastic force of the spring. In other words, the locking lever 32 may be maintained in the locked state. In this locked state, when the user manipulates any one of the front handle 42a and the rear handle 42b by pulling the handle, as shown in FIGS. 7 and 8, the force of manipulating the handle may be transmitted to the hinge levers 41 through the operation cable 42c (refer to arrows F1), and each of the hinge levers 41 may be rotated about the hinge shaft 41a to rotate the locking lever 32. Due to the rotation of the locking lever 32, the locking protrusion 32a is withdrawn from the locking recesses 31a formed in the locking rail 31, whereby the console box 20 may be moved manually along the fixed rails 11 in the forward-and-backward direction.

Subsequently, when the force of manipulating the front handle 42a or the rear handle 42b is removed after the console box 20 is moved in a desired direction and reaches a desired position, as shown in FIGS. 5 and 6, the locking lever 32 may be rotated by the elastic force of the spring to insert the locking protrusion 32a back into one of the locking recesses 31a, whereby the locking lever 32 is turned to the locked state, in which the console box 20 may be prevented from being moved further.

The locking operation unit 40 according to the present disclosure may include an automatic operation unit 43, configured to automatically operate the hinge levers 41, and a controller 45, configured to receive signals from a manipulation unit 44 based on a user manipulation and may be configured to operate the automatic operation unit 43. The manipulation unit 44 may be manipulated or operated using application software installed in an occupant's smartphone or tablet personal computer (PC), a navigation system of the vehicle, or the like.

The automatic operation unit 43 may include a first solenoid 43a, fixed to the console bracket 50 to be disposed adjacent to the hinge levers 41 and the controller 45 may be configured to supply electrical power to the first solenoid 43a, and a plunger 43b, disposed at the first solenoid 43a to move forwards or backwards while contacting the hinge levers 41.

As described above, two hinge levers 41 may be provided, and the two hinge levers 41 may be arranged proximate to the left and right sides of the locking lever 32, with the locking lever 32 interposed therebetween. The first solenoid 43a may be fixed at a position between the two hinge levers 41, and the plunger 43b may protrude from the first solenoid 43a in a lateral direction (e.g., toward the moving rails).

Figure 9:
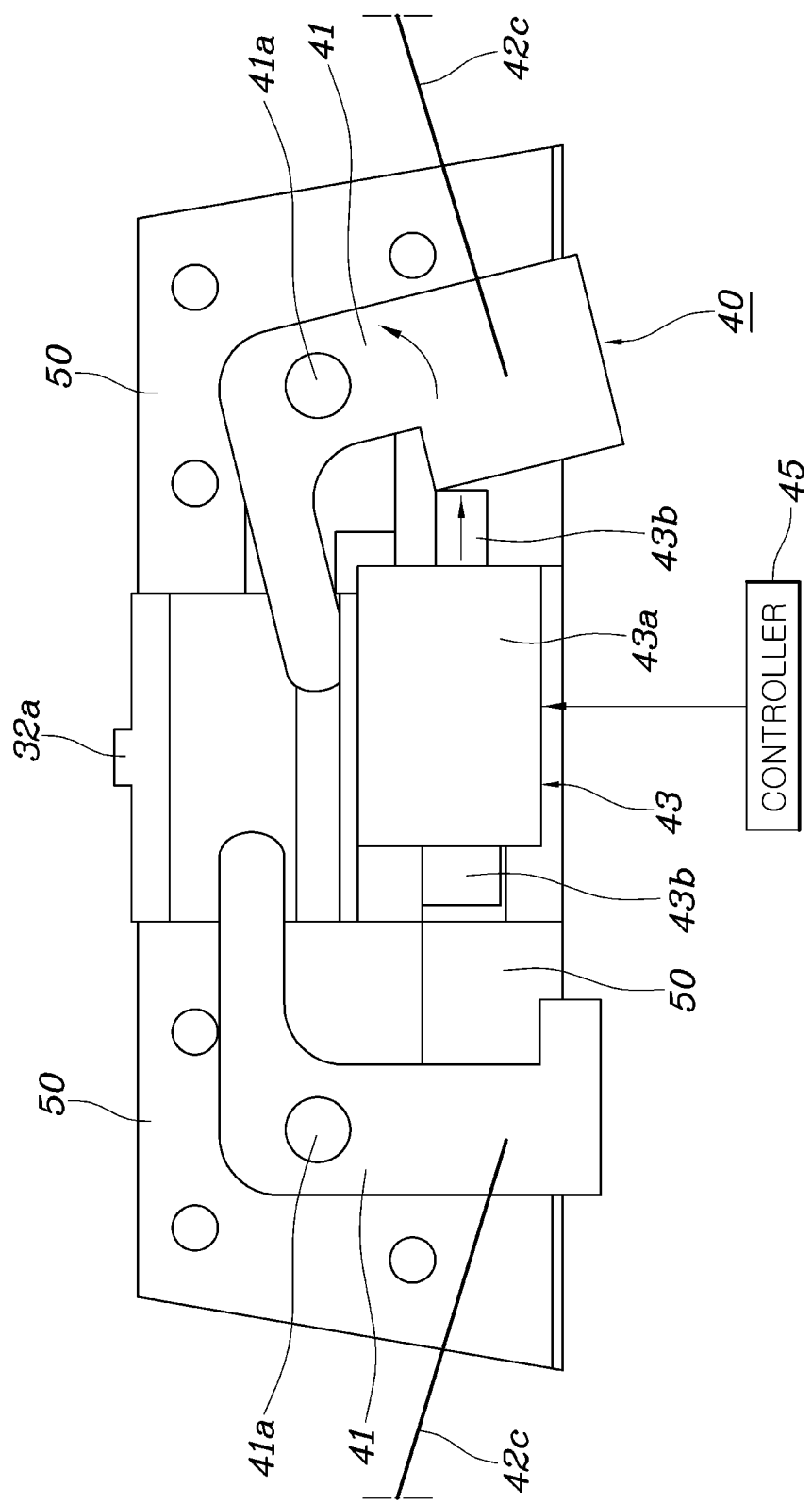
FIG. 9 is a view illustrating the operation of a hinge lever when electrical power is applied to a first solenoid to move the console box automatically according to an exemplary embodiment of the present disclosure.
Figure 10:
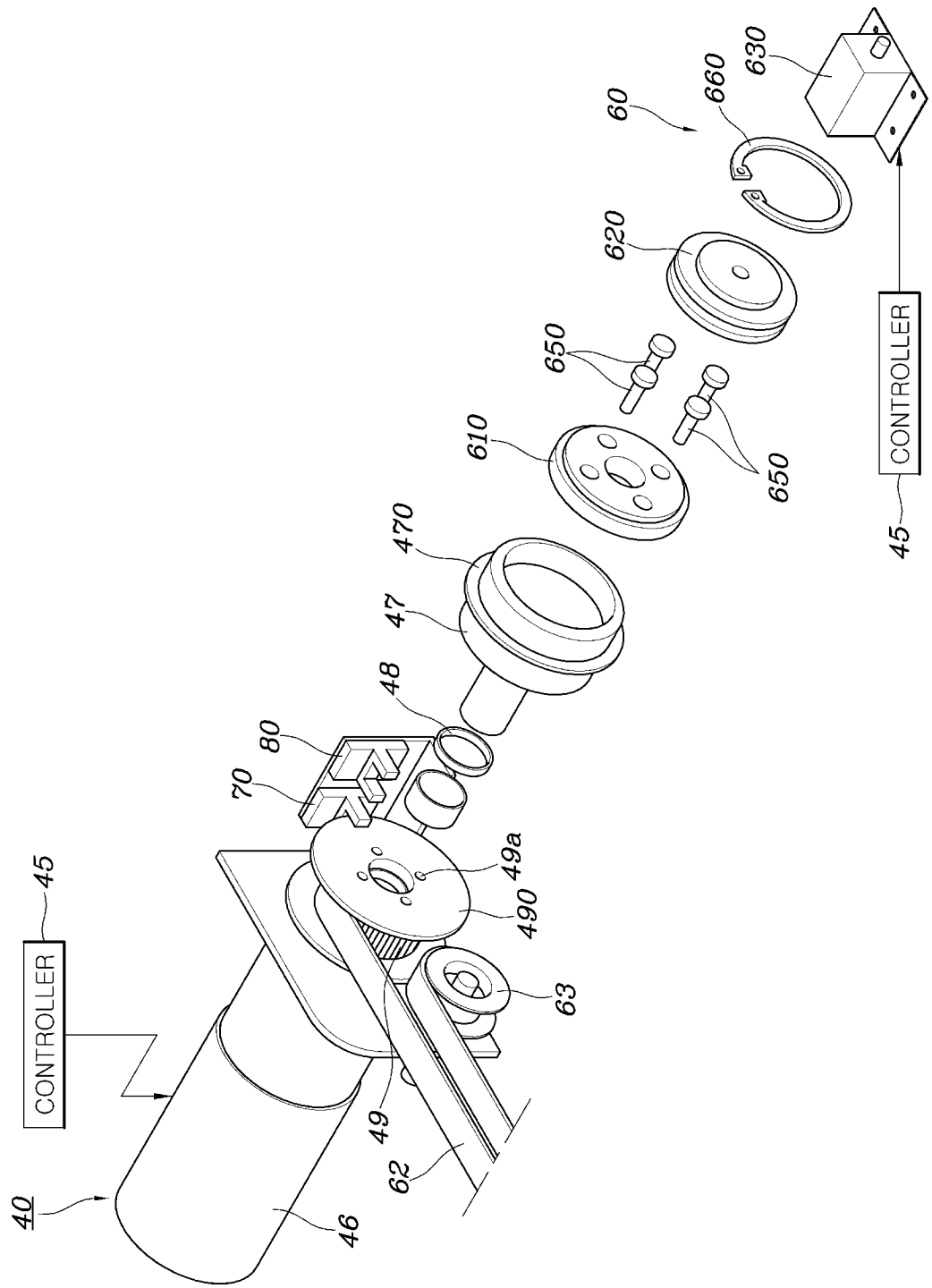
FIG. 10 is a view illustrating the locking operation unit, a clutch unit, a first hall sensor and a second hall sensor according to an exemplary embodiment of the present disclosure.

When electrical power is supplied to the first solenoid 43a under the control of the controller 45, as shown in FIG. 9, the plunger 43b moves rightwards and rotates a rightmost of the hinge levers 41. As the hinge lever 41 rotates about the hinge shaft 41a, as described above, the hinge lever 41 operates the locking lever 32 to thus displace the locking protrusion 32a from the locking recesses 31a. Accordingly, the locking lever 32 is turned to an unlocked state, in which the console box 20 may move along the fixed rails 11 in the forward-and-backward direction.

The locking operation unit 40 may further include a motor 46 operated by the controller 45, a motor shaft 47, directly connected to the motor 46 to be rotated therewith, a driving pulley 49, coupled to the outer circumferential surface of the motor shaft 47 to rotate relative thereto via a bearing 48, a clutch unit 60, coupled to the motor shaft 47 to interconnect or disconnect the motor shaft 47 and the driving pulley 49 in response to the supply or interruption of electrical power, and a power transmission belt 62, that interconnects the driving pulley 49 and a driven pulley 61 and is coupled to the console bracket 50.

The driving pulley 49 and the driven pulley 61 may be disposed proximate the first end and the second end of the rail unit 10. In particular, the driving pulley 49 may be disposed proximate to the rear ends of the fixed rails 11, and the driven pulley 61 may be disposed proximate to the front ends of the fixed rails 11. However, the present disclosure is not limited thereto. The driving pulley 49 and the driven pulley 61 may be inversely disposed as needed. Additionally, idle rollers 63 may be rotatably mounted adjacent to the driving pulley 49 and the driven pulley 61 to maintain constant tension of the power transmission belt 62. The power transmission belt 62 may be disposed over the driving pulley 49 and the driven pulley 61 via the idle rollers 63.

The clutch unit 60 according to the present disclosure may include a locking pin housing 610 and a locking pin cover 620, which are coupled to the motor shaft 47, a second solenoid 630, which is coupled to the locking pin cover 620 to allow the locking pin cover 620 to be rotated with the motor shaft 47 and to which the supply of electrical power may be adjusted by the controller 45, a plurality of locking pins 650, each having a first end mounted in the locking pin cover 620 to be elastically supported by a corresponding one of springs 640 and a second end (e.g., an opposite end) that penetrates the locking pin housing 610 and protrudes toward the driving pulley 49, and a C-type fastening ring 660, used to couple the motor shaft 47 and the locking pin cover 620 to each other.

When electrical power is supplied to the second solenoid 630 by the controller 45, the locking pins 650 may be moved backwards while compressing the springs 640 to be disconnected from the driving pulley 49. When the supply of electrical power to the second solenoid 630 is interrupted by the controller 46, the locking pins 650 may be moved forwards by the elastic restoring force of the springs 640, and the front ends of the locking pins 650 may be inserted into pulley holes 49a formed in the driving pulley 49, whereby the locking pins 650 are connected to the driving pulley 49.

Figure 11:
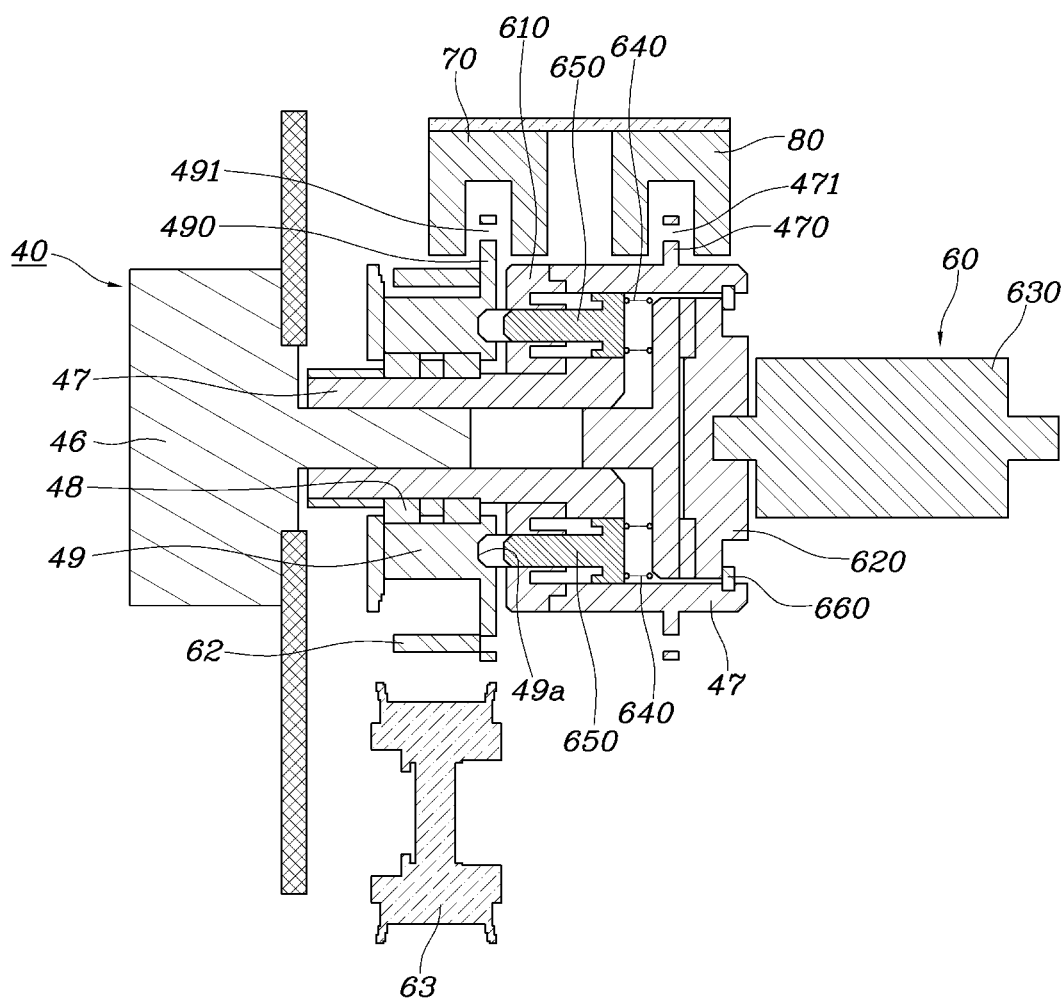

FIG. 11 illustrates the state in which the supply of electrical power to the motor 46 is interrupted and the supply of electrical power to the second solenoid 630 is allowed. When electrical power is supplied to the second solenoid 630, the locking pins 650 may be moved backwards toward the second solenoid 630. Accordingly, the springs 640 are compressed, and the front ends of the locking pins 650 may be withdrawn from the pulley apertures 49a, to thus disconnect the locking pins 650 from the driving pulley 49.

In addition, as shown in FIG. 11, when the supply of electrical power to the motor 46 is interrupted, the supply of electrical power to the first solenoid 43a is also interrupted. Accordingly, movement of the console box 20 may only be possible manually, by manipulating the front handle 42a and the rear handle 42b.

Figure 12:
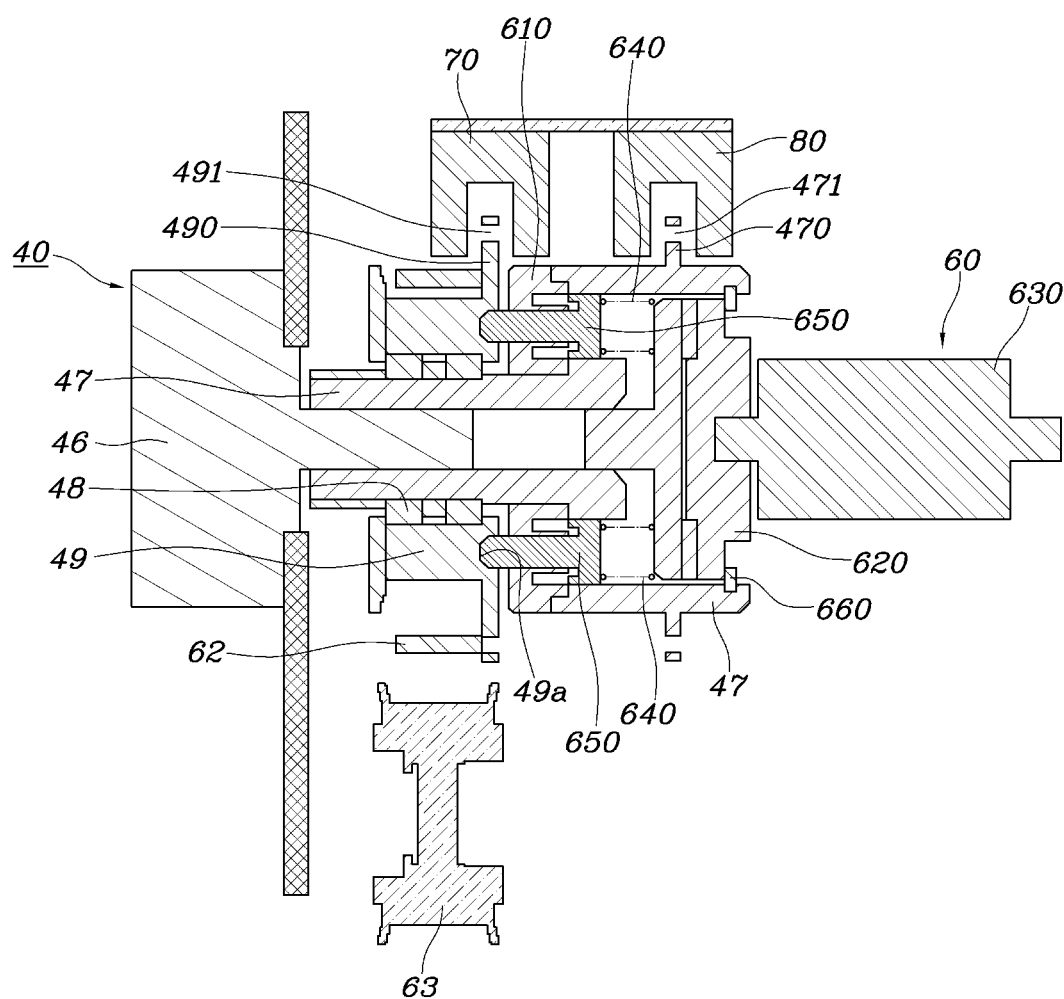
Figure 13:
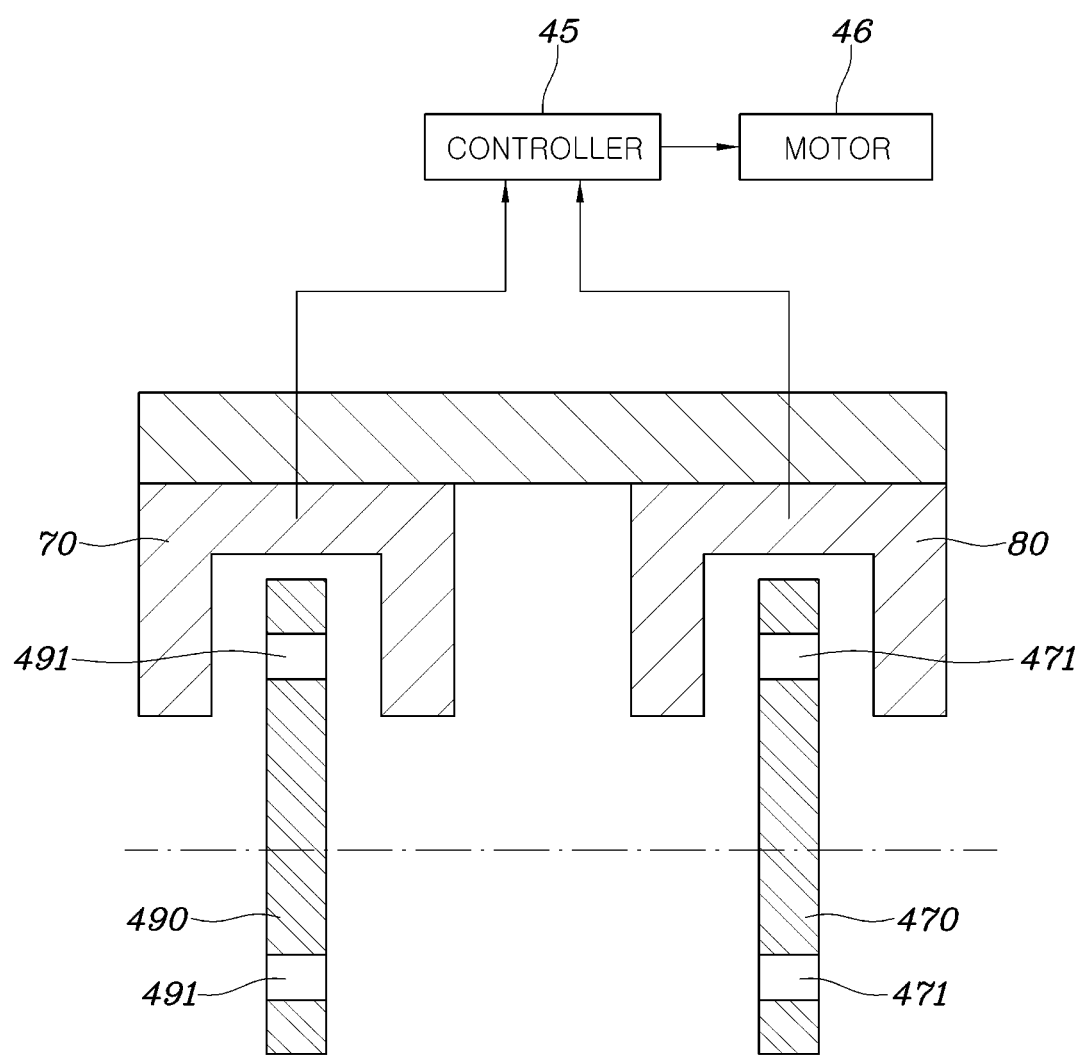
FIG. 13 is a view illustrating the first hall sensor and the second hall sensor according to an exemplary embodiment of the present disclosure.

FIG. 12 illustrates the state in which the supply of electrical power to the motor 46 is allowed and the supply of electrical power to the second solenoid 630 is interrupted. When the supply of electrical power to the second solenoid 630 is interrupted, the locking pins 650 may be moved forwards toward the driving pulley 49 by the elastic restoring force of the springs 640. Accordingly, the front ends of the locking pins 650 may be inserted into the pulley apertures 49a to connect the locking pins 650 to the driving pulley 49.

When electrical power is supplied to the motor 46, the rotational force of the motor 46 may be transmitted to the driving pulley 49 via the motor shaft 47, the locking pin housing 610, the locking pin cover 620 and the locking pins 650, whereby the driving pulley 49 may be rotated. In addition, when electrical power is supplied to the motor 46, electrical power is also supplied to the first solenoid 43a, and the locked state of the locking lever 32 may be released.

Therefore, when the driving pulley 49 is rotated by the power of the motor 46, the console bracket 50, which is coupled with the driving pulley 49, and the moving rails 12 and the console box 20, which are coupled with the console bracket 50, may be automatically moved along the fixed rails 11 in the forward-and-backward direction by the power of the motor 46. While the console box 20 is moved automatically by the power of the motor 46, when the movement of the console box 20 is interrupted by an obstacle or some other cause, the motor 46 or other components may be damaged due to overload.

Accordingly, the present disclosure has a fail-safe function capable of preventing the motor 46 from being overloaded. To ensure that the locking pins 650 are capable of being withdrawn from the pulley apertures 49a when the motor 46 is overloaded, the pulley apertures 49a and the end portions of the locking pins 650, which are inserted into the pulley apertures 49a, may be formed to have a round shape. In other words, while the driving pulley 49 is rotated by the operation of the motor 46 and the console box 20 and the moving rails 12 are moved along the fixed rails 11, when the movement of the console box 20 is interrupted by an obstacle or the like (e.g. a foreign substance, external force, etc.), a load is applied to the driving pulley 49, which is connected with the power transmission belt 62, and thus the driving pulley 49 may be unable to be smoothly rotated. Accordingly, the front ends of the locking pins 650, formed to have a round shape, may be withdrawn from the pulley apertures 49a, formed to have a round shape. In other words, the shape of the front ends allows for the locking pins to be withdrawn (e.g., escape) from the pulley apertures.

Therefore, the rotational force of the motor 46 is not transmitted to the driving pulley 49, and therefore the driving pulley 49 is not rotated. Accordingly, it may be possible to prevent the motor 46 from being overloaded. When the motor 46 is overloaded, the operation of the motor 46 may be stopped by force to prevent damage to the motor 46 or other peripheral components.

Accordingly, the present disclosure may further include a circular-plate-shaped first flange 490 disposed at the driving pulley 49, a first sensing aperture 491 formed in the first flange 490, a circular-plate-shaped second flange 470 disposed at the motor shaft 47, a second sensing aperture 471 formed in the second flange 470, a first hall sensor 70 configured to sense the first sensing aperture 491, and a second hall sensor 80 configured to sense the second sensing aperture 471. When electrical power is applied to the motor 46, the controller 45 may be configured to determine whether the motor 47 is overloaded based on whether operation signals are transmitted thereto from the first hall sensor 70 and the second hall sensor 80.

In other words, when electrical power is applied to the motor 46 and when an operation signal from the first hall sensor 70 and an operation signal from the second hall sensor 80 are simultaneously transmitted to the controller 45, the controller 45 may be configured to determine that the state of the motor 46 is a normal state, in which the motor 46 is not overloaded. When electrical power is applied to the motor 46 and when an operation signal from the first hall sensor 70 is not transmitted to the controller 45 but an operation signal from the second hall sensor 80 is transmitted to the controller 45, the controller 45 may be configured to determine that the motor 46 is overloaded.

Figure 14:
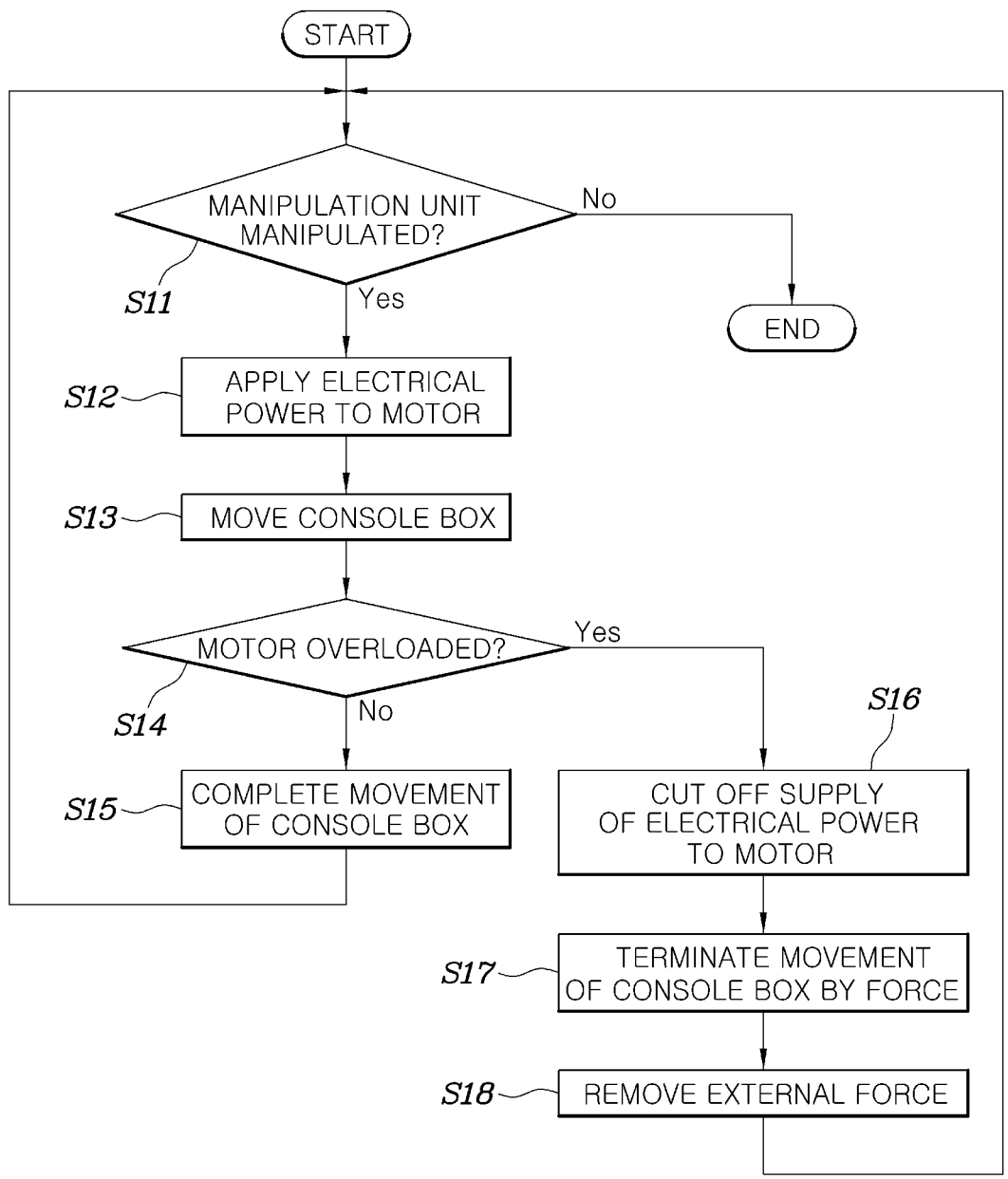
FIG. 14 is a flowchart illustrating a fail-safe function using the first hall sensor and the second hall sensor.

The present disclosure will now be described further with reference to FIG. 14. When the manipulation unit 44 is manipulated by a user (S11), electrical power may be applied to the motor 46, and the motor 46 may be operated (S12). Subsequently, the driving pulley 49 may be rotated, and the console box 20 and the moving rails 12 may be moved along the fixed rails 11 (S13). When the movement of the console box 20 is not interrupted by an obstacle or the like (e.g. a foreign substance, external force, etc.) (S14), the locking pins 650 may be inserted into the pulley apertures 49a. Accordingly, the first flange 490 and the second flange 470 may be rotated together, and an operation signal from the first hall sensor 70 and an operation signal from the second hall sensor 80 may be simultaneously transmitted to the controller 45. The controller 45 may thus be configured to determine that the state of the motor 46 is a normal state, in which the motor 46 is not overloaded. Consequently, the console box 20 may be moved to a desired position based on the manipulation through the manipulation unit 44 (S15).

However, as described above, while the motor 46 is operated by electrical power applied thereto and the console box 20 and the moving rails 12 are moved along the fixed rails 11 by the rotation of the driving pulley 49, when the movement of the console box 20 is interrupted by an obstacle or the like (e.g. a foreign substance, external force, etc.), the locking pins 650 are withdrawn from the pulley apertures 49a, and thus the rotation of the driving pulley 49 is stopped. Accordingly, the first flange 490 is not rotated, but the second flange 470 is rotated. Therefore, the first hall sensor 70 does not generate an operation signal, but the second hall sensor 80 generates an operation signal, and the operation signal from the second hall sensor 80 may be transmitted to the controller 45. Accordingly, the controller 45 may be configured to determine that the state of the motor 46 is an erroneous state, in which the motor 46 is overloaded.

In response to determining that the motor 46 is overloaded, as described above, the controller 45 may be configured to cut off the supply of electrical power to the motor 46, whereby the operation of the motor 46 is terminated by force (S16). Accordingly, movement of the console box 20 may be terminated by force (S17). The user may continue to use the console box 20 by removing the external force (S18) after the termination of the movement of the console box 20.

As is apparent from the above description, the exemplary embodiment of the present disclosure has a construction in which the console box 20 may be moved to a desired position in the forward-and-backward direction of the vehicle and in which the console box 20 may be inserted into the space under the crash pad 4 when the console box 20 moves in the forward direction of the vehicle, whereby utilization of the interior space of the vehicle is maximized, and the console device is therefore suitable for installation in an autonomous vehicle.

In addition, the exemplary embodiment of the present disclosure has a fail-safe function that is capable of preventing the motor 46 from being overloaded while the console box 20 is automatically moved using the power of the motor 46, whereby the durability of the device is improved.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:
1. A console device for a vehicle, comprising:
    a console box movably mounted in an interior space of a vehicle to be inserted into a space under a crash pad, wherein the console box is coupled to a rail unit mounted in the interior space of the vehicle to be movable along the rail unit;

a locking unit mounted to be connected with the rail unit and the console box to restrict or allow movement of the console box; and a locking operation unit for enabling the locking unit to be operated manually or automatically, wherein the locking operation unit allows the console box to move along the rail unit upon automatic operation of the locking unit, wherein the locking unit includes:
  a locking rail fixed to a floor panel to be arranged parallel to the rail unit, wherein the locking rail includes locking recesses formed continuously in a longitudinal direction thereof; and
  a locking lever mounted to a console bracket coupled to the console box to be rotatable, the locking lever having a locking protrusion protruding from a first end thereof,
  wherein, when the locking protrusion is inserted into one of the locking recesses, the locking lever restricts movement of the console box, and
  wherein, when the locking protrusion is withdrawn from the locking recesses, the locking lever releases restriction of movement of the console box, and wherein the locking operation unit includes:
  a hinge lever rotatably coupled to the console bracket, the hinge lever being maintained in contact with the locking lever; and
  a manual operation unit for allowing the hinge lever to be operated manually.

2. The console device according to claim 1, wherein the rail unit includes:
  a fixed rail fixed to a floor panel; and
  a moving rail connected to the console box, wherein the moving rail is coupled to the fixed rail to be movable along the fixed rail.

3. The console device according to claim 1, wherein the manual operation unit includes:
  a front handle and a rear handle respectively coupled to a front surface and a rear surface of the console box to be rotatable; and
  an operation cable that interconnects the front handle and the hinge lever and interconnects the rear handle and the hinge lever.

4. The console device according to claim 1, wherein the locking operation unit includes:
  a hinge lever rotatably coupled to the console bracket, the hinge lever being maintained in contact with the locking lever;
  an automatic operation unit configured to automatically operate the hinge lever; and
  a controller configured to operate the automatic operation unit by receiving signals from a manipulation unit based on a user manipulation.

5. The console device according to claim 4, wherein the automatic operation unit includes:
  a first solenoid fixed to the console bracket to be adjacent to the hinge lever, wherein the controller is configured to supply electrical power to the first solenoid; and
  a plunger disposed at the first solenoid to move forwards or backwards while contacting the hinge lever.

6. The console device according to claim 4, wherein the locking operation unit further includes:
  a motor operated by the controller;
  a motor shaft directly connected to the motor to be rotated therewith;
  a driving pulley coupled to an outer circumferential surface of the motor shaft to rotate relative thereto via a bearing;
  a clutch unit coupled to the motor shaft to interconnect or disconnect the motor shaft and the driving pulley in response to supply or interruption of electrical power; and
  a power transmission belt coupled to the console bracket while interconnecting the driving pulley and a driven pulley.

7. The console device according to claim 6, wherein the driving pulley and the driven pulley are disposed proximate to a first end and a second end of the rail unit, idle rollers are rotatably mounted adjacent to the driving pulley and the driven pulley to maintain constant tension of the power transmission belt, and the power transmission belt is disposed over the driving pulley and the driven pulley via the idle rollers.

8. The console device according to claim 6, wherein the clutch unit includes:
  a locking pin housing and a locking pin cover coupled to the motor shaft;
  a second solenoid coupled to the locking pin cover to allow the locking pin cover to be rotated with the motor shaft, wherein the controller is configured to supply electrical power to the second solenoid; and
  a plurality of locking pins, each having a first end mounted in the locking pin cover to be elastically supported by a corresponding one of springs and a second end that penetrates the locking pin housing and protrudes toward the driving pulley,
  wherein, when electrical power is supplied to the second solenoid, the locking pins are moved backwards while compressing the springs, and are disconnected from the driving pulley, and
  wherein, when supply of electrical power to the second solenoid is interrupted, the locking pins are moved forwards by elastic force of the springs, are inserted into pulley apertures formed in the driving pulley, and are connected to the driving pulley.

9. The console device according to claim 8, wherein the pulley apertures and end portions of the locking pins that are inserted into the pulley apertures are formed to have a round shape to allow the locking pins to be withdrawn from the pulley holes when the motor is overloaded.

10. The console device according to claim 6, further comprising:
  a first flange disposed at the driving pulley, the first flange being formed in a shape of a circular plate having therein a first sensing aperture;
  a second flange disposed at the motor shaft, the second flange being formed in a shape of a circular plate having therein a second sensing aperture;
  a first hall sensor configured to sense the first sensing aperture; and
  a second hall sensor configured to sense the second sensing aperture,
  wherein, when electrical power is applied to the motor, the controller is configured to determine whether the motor is overloaded based on whether operation signals are transmitted thereto from the first hall sensor and the second hall sensor.

11. The console device according to claim 10, wherein, when electrical power is applied to the motor, when an operation signal from the first hall sensor and an operation signal from the second hall sensor are simultaneously transmitted to the controller, the controller is configured to determine that a state of the motor is a normal state, in which the motor is not overloaded.

12. The console device according to claim 11, wherein when electrical power is applied to the motor, when an operation signal from the first hall sensor is not transmitted to the controller but an operation signal from the second hall sensor is transmitted to the controller, the controller is configured to determine that the motor is overloaded.

13. The console device according to claim 12, wherein, in response to determining that the motor is overloaded, the controller is configured to cut off supply of electrical power to the motor to terminate operation of the motor by force.

* * * * *